(12) United States Patent
Hebert et al.

(10) Patent No.: US 6,892,909 B1
(45) Date of Patent: May 17, 2005

(54) PNEUMATIC PARTICULATE DISPENSING SYSTEM

(76) Inventors: Shelton L. Hebert, 206 Blyth, Vitctoria, TX (US) 77904; Russell Doerr, 210 Macon Creek, Victoria, TX (US) 77901

( * ) Notice: Subject to any disclaimer, the term of this patent is extended or adjusted under 35 U.S.C. 154(b) by 69 days.

(21) Appl. No.: 10/455,539

(22) Filed: Jun. 6, 2003

(51) Int. Cl.[7] .................................................. B65B 1/04
(52) U.S. Cl. ..................... 222/637; 406/38; 406/127; 406/130; 406/144; 406/145; 406/146; 141/65; 141/67; 111/174
(58) Field of Search ........................ 222/324, 333–335, 222/394, 630, 637; 406/38, 41, 65, 68, 109, 406/122, 127–130, 132, 133, 139, 144–146, 406/165–167; 111/174; 141/65, 67

(56) References Cited

U.S. PATENT DOCUMENTS

| | | | |
|---|---|---|---|
| 3,314,732 A | | 4/1967 | Hagan |
| 3,746,254 A | * | 7/1973 | Duncan et al. ............. 239/697 |
| 4,221,508 A | | 9/1980 | Haines |
| 4,569,161 A | * | 2/1986 | Shipman ..................... 451/99 |
| 4,583,883 A | | 4/1986 | Johanning |
| 4,610,574 A | * | 9/1986 | Peters ........................ 422/131 |
| 4,821,495 A | | 4/1989 | De Buhr et al. |
| 4,846,608 A | | 7/1989 | Sanders |
| 4,988,240 A | | 1/1991 | Thompson |
| 5,156,102 A | | 10/1992 | Anderson |
| 5,282,573 A | * | 2/1994 | Reimer ........................ 239/85 |
| 5,490,745 A | * | 2/1996 | Thiele et al. ............... 406/132 |
| 5,545,410 A | * | 8/1996 | Fox et al. ................... 424/439 |
| 6,142,714 A | | 11/2000 | Montag |
| 6,263,802 B1 | * | 7/2001 | Burian et al. ............... 105/280 |

FOREIGN PATENT DOCUMENTS

| | | |
|---|---|---|
| JP | 0821589 | 8/1996 |
| JP | 2002068473 | 3/2002 |

* cited by examiner

Primary Examiner—J. Casimer Jacyna
(74) Attorney, Agent, or Firm—David Guerra (57) ABSTRACT

A pneumatic particulate dispensing system having a hopper for storing particulate material, such as animal feed, fertilizers, pesticides and the like. The hopper is connected to a T-fitting which encloses a velocity tube. An air blowing unit is connected to the T-fitting and the velocity tube through an interchangeable adaptor allowing for a variety of air blowing units to be installed. An adjustable rotary valve extends into the interior of the hopper from the T-fitting allowing for a user to adjust the amount of particulate material to be dispensed adjacent the velocity tube. A discharge tube is connected to the T-fitting downstream of the velocity tube, wherein the discharge tube has a rotating elbow for allowing the user to adjust the dispensing direction. A variety of nozzles can be attached to the end of the discharge tube. A support frame having a hitch insert and cradles is used to support and transport the particulate dispensing system to remote locations.

17 Claims, 6 Drawing Sheets

PNEUMATIC PARTICULATE DISPENSING SYSTEM

BACKGROUND OF THE INVENTION

1. Field of the Invention

The present invention relates to a pneumatic particulate dispensing system for use in connection with the pneumatically dispensing of particulate material, such as fertilizers, seeds, pesticides, herbicides and insecticides. The pneumatic particulate dispensing system has particular utility in connection with providing a portable device for pneumatically dispensing particulate material.

2. Description of the Prior Art

Pneumatic particulate dispensing systems are desirable for distributing particulate material, such as corn, protein, food, fertilizers, seeds, pesticides, herbicides and insecticides through a singe portable device which can be easily mounted to a frame hitchably attachable to a vehicle. In current particulate dispensers, dispensing of particulate material is performed using complex and expensive devices using blower units, hoppers, and discharge tubes. Such devices use complex valve assemblies to adjust the flow of particulate material from the hopper to the passing airflow from the blower unit. Furthermore, these known particulate dispensers are not easily assembled or transported, which adds to the time required by the user to assemble, transport, use, and disassemble the dispensing device. Particulate dispenser users would quickly recognize that a system for quickly and easily dispensing particulate material in remote locations is very beneficial to the industry.

Additionally, other knows methods of hunters dispensing or filling feeders with particulate material is by packing feed sacks or buckets of feed up a ladder and then dumpling the feed from the sacks or buckets into the feeder. This method is inherently dangerous to the hunter, as well as strenuous and time consuming.

The use of hopper fed air powered granule dispensers is known in the prior art. For example, U.S. Pat. No. 5,156,102 to Andersen issued on Oct. 20, 1992 discloses an air powered granular material sowing apparatus having a blower connected to a tapered injector which forces air past a grain filled hopper. The air forces the grain towards a discharge tube.

U.S. Pat. No. 4,583,883 to Jahanning issued on Apr. 22, 1986 discloses a pneumatic conveyor having a pneumatic blower attached to a container featuring a hopper that dispenses grain into the airflow path via a bucket wheel. The grain from the bucket wheel is then discharged through an upright conveyor tube or a horizontal conveyor line.

Similarly, U.S. Pat. No. 4,221,508 to Haines issued on Sep. 9, 1980 discloses a forage harvesting towing vehicle having a blower attached to discharge tube, wherein the forage harvesting vehicle is attachable to a vehicle hitch assembly.

Additionally, U.S. Pat. No. 4,846,608 to Sanders discloses a pneumatic grain conveyor having a blower which forces air past a plurality of hoppers that dispenses material stored in the hopper into the airflow path from the blower. The material is dispensed from the hoppers through a control gate assembly located above a venturi.

U.S. Pat. No. 3,314,732 to Hagan discloses an insulation blowing apparatus whereby the insulation is drawn from a hopper by a fan and then blow into a conduit having a valve.

U.S. Pat. No. 4,821,495 to De Buhr et al. discloses a blower and discharge spout assembly having a blower connected to a fitting which is connected to an elevated discharge spout.

Lastly, U.S. Pat. No. 6,142,714 to Montag discloses a particulate material conveyor having a hopper attached to a power auger which conveys the particulate material to a fan which forces the particulate material through a conduit allowing a user to fill a receptacle.

Additionally, further examples of known pneumatic material dispensers are found in U.S. Pat. No. 4,988,240 to Thompson; JP 08215589 to Soichi et al.; and JP 2002068473 to Shigeru. While each of these systems may provide devices for dispensing material, they do not teach the use of a portable device for pneumatically dispensing particulate material fed by a hopper through a rotatable gate valve connected to a T-fitting which encloses a velocity tube.

While the above-described devices fulfill their respective, particular objectives and requirements, the aforementioned patents do not describe a pneumatic particulate dispensing system having an air blower connected to a velocity tube via an adapter, which allows for the use of a variety of different air blowers, wherein the velocity tube creates a vacuum that removes the particulate material from an above mounted hopper through an adjustable rotary valve. Furthermore, the above-described devices make no provisions for a rotary valve that is connected to a T-fitting which encloses the velocity tube, wherein the rotary valve extends into the hopper, and whereby the entire system is supported by cradles mounted to a support frame adapted to inserted into a vehicle trailer hitch.

Therefore, a need exists for a new and improved pneumatic particulate dispensing system that can be used for a portable device for pneumatically dispensing particulate material. In this regard, the present invention substantially fulfills this need. In this respect, the pneumatic particulate dispensing system according to the present invention substantially departs from the conventional concepts and designs of the prior art, and in doing so provides an apparatus primarily developed for the purpose of pneumatically dispensing particulate material through the use of a portable device.

SUMMARY OF THE INVENTION

In view of the foregoing disadvantages inherent in the known types of hopper fed air powered granule dispensers now present in the prior art, the present invention provides an improved pneumatic particulate dispensing system, and overcomes the above-mentioned disadvantages and drawbacks of the prior art. As such, the general purpose of the present invention, which will be described subsequently in greater detail, is to provide a new and improved pneumatic particulate dispensing system and method which has all the advantages of the prior art mentioned heretofore and many novel features that result in a pneumatic particulate dispensing system which is not anticipated, rendered obvious, suggested, or even implied by the prior art, either alone or in any combination thereof.

To attain this, the present invention essentially comprises a particulate material container, such as a hopper, for storing particulate material therein. A fitting connected to the particulate material container, wherein the fitting is hollow and in fluid communication with the particulate material container. A conduit adapter is connected to the fitting and is adapted to connect a variety of air blowing units to the fitting, wherein the conduit adapter is in fluid communication with the fitting. A valve is connected to the fitting and the particulate material container for controlling the amount of particulate material that is transferred from the particulate material container to the fitting. A discharge tube is connected to the fitting.

The present invention is mounted on support frame having at least one cradle for supporting the air blower and the discharge tube. The frame support has a hitch member for supporting the frame from a vehicle hitch assembly.

There has thus been outlined, rather broadly, the more important features of the invention in order that the detailed description thereof that follows may be better understood and in order that the present contribution to the art may be better appreciated.

The invention may also include a velocity tube for creating a vacuum below the hopper for pulling particulate material from the hopper into a discharge tube which can be articulated with respect to the velocity tube. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pneumatic particulate dispensing system that has all of the advantages of the prior art hopper fed air powered granule dispensers and none of the disadvantages.

It is another object of the present invention to provide a new and improved pneumatic particulate dispensing system that may be easily and efficiently manufactured and marketed.

An even further object of the present invention is to provide a new and improved pneumatic particulate dispensing system that has a low cost of manufacture with regard to both materials and labor, and which accordingly is then susceptible of low prices of sale to the consuming public, thereby making such pneumatic particulate dispensing system economically available to the buying public.

Still another object of the present invention is to provide a new pneumatic particulate dispensing system that provides in the apparatuses and methods of the prior art some of the advantages thereof, while simultaneously overcoming some of the disadvantages normally associated therewith.

Even still another object of the present invention is to provide a pneumatic particulate dispensing system for dispensing particulate material through a portable pneumatic device. This allows a user with an easy and lightweight system for adjustably dispensing particulate material over a large surface or into an overhead receptacle. The system can be used by a single hunter, for example, for filling overhead animal feeders. The off the shelf components allows the pneumatic particulate dispensing system to be easily assembled and transported to any desired located by mounting the system on a support frame which is adapted to be inserted into a standard vehicle hitch.

Lastly, it is an object of the present invention to provide a new and improved method of dispensing particulate material using a portable pneumatic dispensing system. The user would adjust a rotary valve located in a hopper to the desired dispensing amount, and then fill the hopper with the particulate material that is to be dispensed. A pneumatic device would then be activated providing air flow below the rotary valve, thereby creating a vacuum for pulling the particulate material from the hopper into a discharge tube. The user would then attach a discharge nozzle to the discharge tube, wherein the discharge nozzle can be stationary or articulating.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings, and particularly to FIGS. 1–6, a preferred embodiment of the pneumatic particulate dispensing system of the present invention is shown and generally designated by the reference numeral 10.

Figure 1:
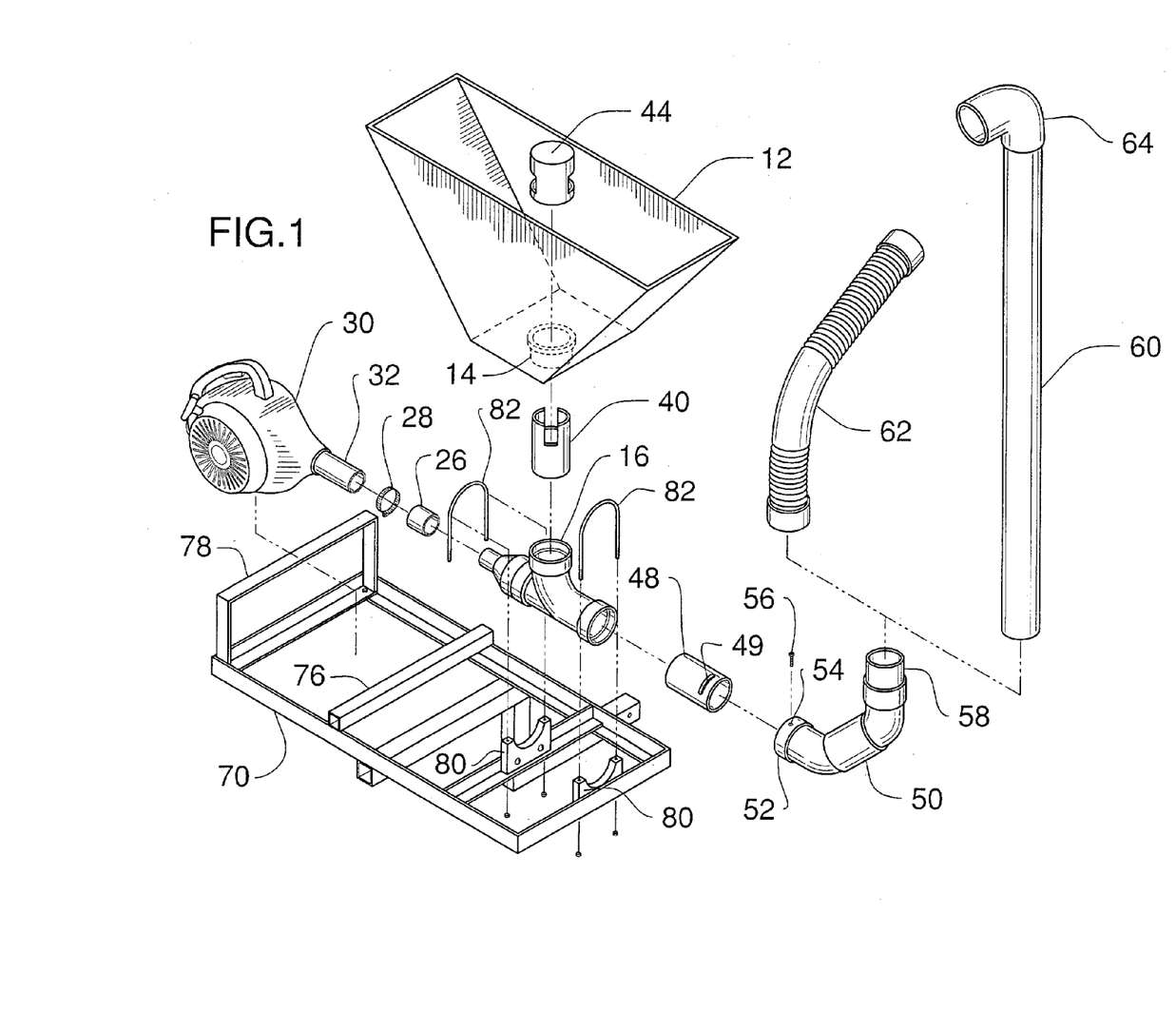
FIG. 1 is an exploded perspective view of the preferred embodiment of the pneumatic particulate dispensing system constructed in accordance with the principles of the present invention.

In FIG. 1, a new and improved pneumatic particulate dispensing system 10 of the present invention for pneumatically dispensing particulate material is illustrated and will be described. More particularly, the pneumatic particulate dispensing system 10 has a hopper 12 mounted to a top oriented opening of a T-fitting 16 by a flanged adapter 14. The T-fitting 16 is hollow, allowing for fluid to travel therethrough. The hopper 12 is adapted to receive and retain particulate material such as, but not limited to, corn, protein, food, fertilizers, seeds, pesticides, herbicides and insecticides. The T-fitting 16 is connected to a reducer 22 and to a discharge tube 48, thereby coupling the hopper 12, the reducer 22, and the discharge tube 48 in fluid communication with each other. The reducer 22 is connected to the T-fitting 16 by a connector tube 20, which can have a smaller or larger diameter than the reducer and the T-fitting. The flanged adapter 14, the convert coupler 22, and the discharge tube 48 are hollow, allowing fluid to travel therethrough.

Figure 2:
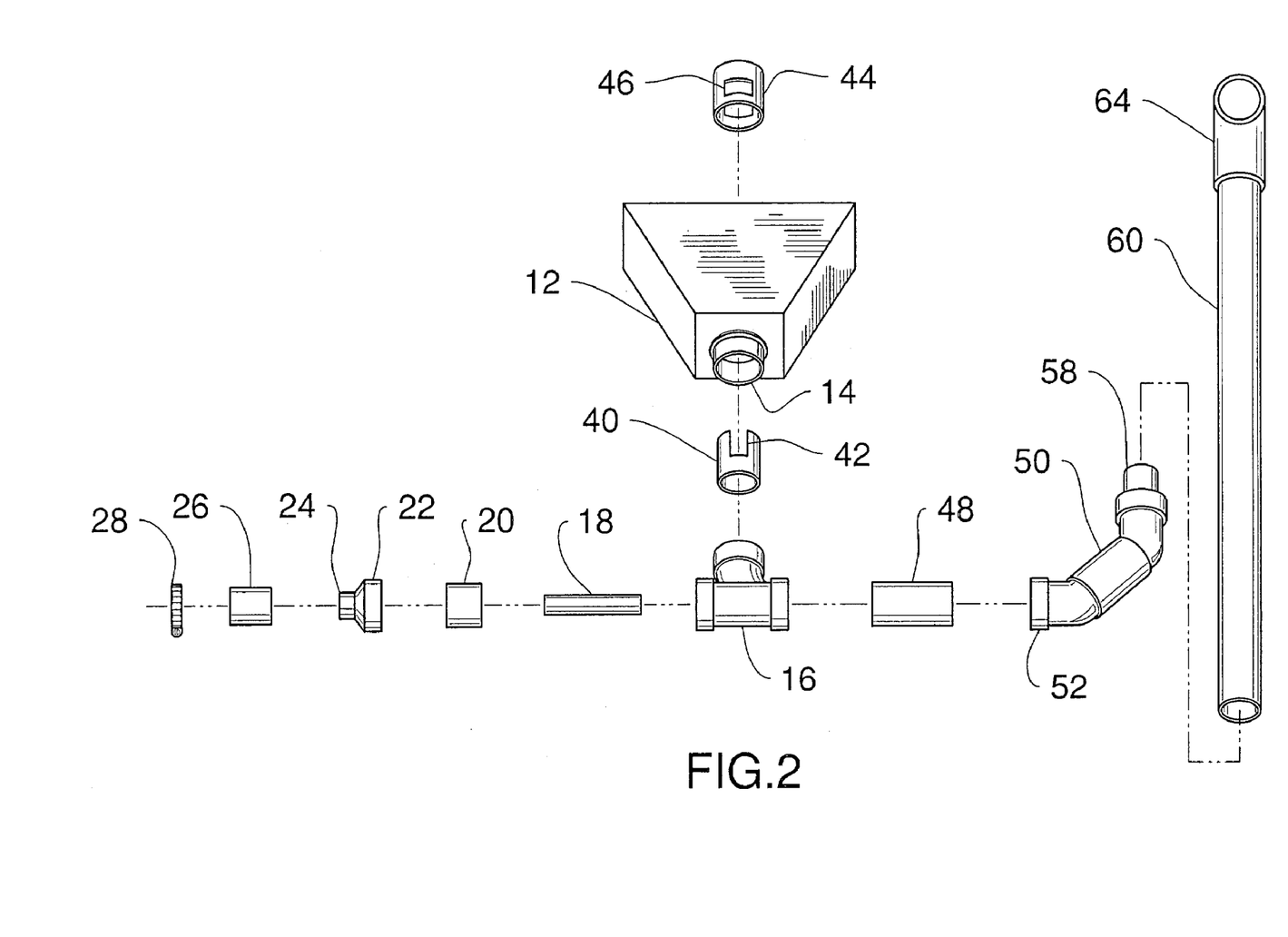
FIG. 2 is an exploded perspective view of the pneumatic particulate dispensing system of the present invention.

A pneumatic generating device 30 is connecting to the converter adapter 22 through an adapter tube 26, which is secured to the outlet of the pneumatic generating device 30 by an adjustable clamp 28. The adapter tube 26 is hollow, allowing fluid to travel therethrough. The adapter tube 26 has a first end diameter sized to receive the outlet of the pneumatic generating device 30 and a second end diameter sized to receive a tapered end 24 of the reducer 22, as best illustrated in FIG. 2. The pneumatic generating device 30 can be an air blower of the type powered by an internal combustion engine, an electric motor, or manually. A plurality of different sized adapter tubes 26 are provided so as a variety of air blowers can be used with the pneumatic particulate dispensing system 10. The discharge tube 48 is connected to the T-fitting 16 opposite where the reducer 22 is connected. The discharge tube 48 has a slot 49 defined adjacent the end opposite of the T-fitting 16 connection end.

A large variety of connection systems can be used to connect the flanged adapter 14, the reducer 22, and the discharge tube 48 to the T-fitting 16. These connection systems can be, but not limited to, threaded connections, adhesive connections, pressure fitted connections, and clamped connections. All of the connections provide a fluid tight seal.

A discharge elbow tube 50 has a first end 52, a threaded bore 54 defined through the first end 52, and a second end 58. The first end 52 has a diameter smaller than the diameter of the discharge tube 48 end opposite the of the T-fitting 16 connection end. The first end 52 of the discharge elbow tube 50 is inserted into the discharge tube 48 until slot 49 is aligned with the threaded bore 54 of the first end 52 of the discharge elbow tube 50. The discharge elbow tube 50 is able to rotate freely with respect to the discharge tube 48. A threaded fastener 56 is inserted through slot 49 and driven into the threaded bore 54, thereby providing a rotational range of motion of the discharge elbow tube 50 with respect to the discharge tube 48. Alternately, the threaded fastener 56 can be a member extending out from the discharge elbow tube 50 adapted to be received by slot 49. The threaded fastener 56 can be driven further into the threaded bore 54 until a sufficient clamping force is produced between the threaded fastener 56, the discharge tube 48, and the discharge elbow tube 50, thereby locking the discharge elbow into a variety of angular positions with respect to the discharge tube 48.

Figure 3:
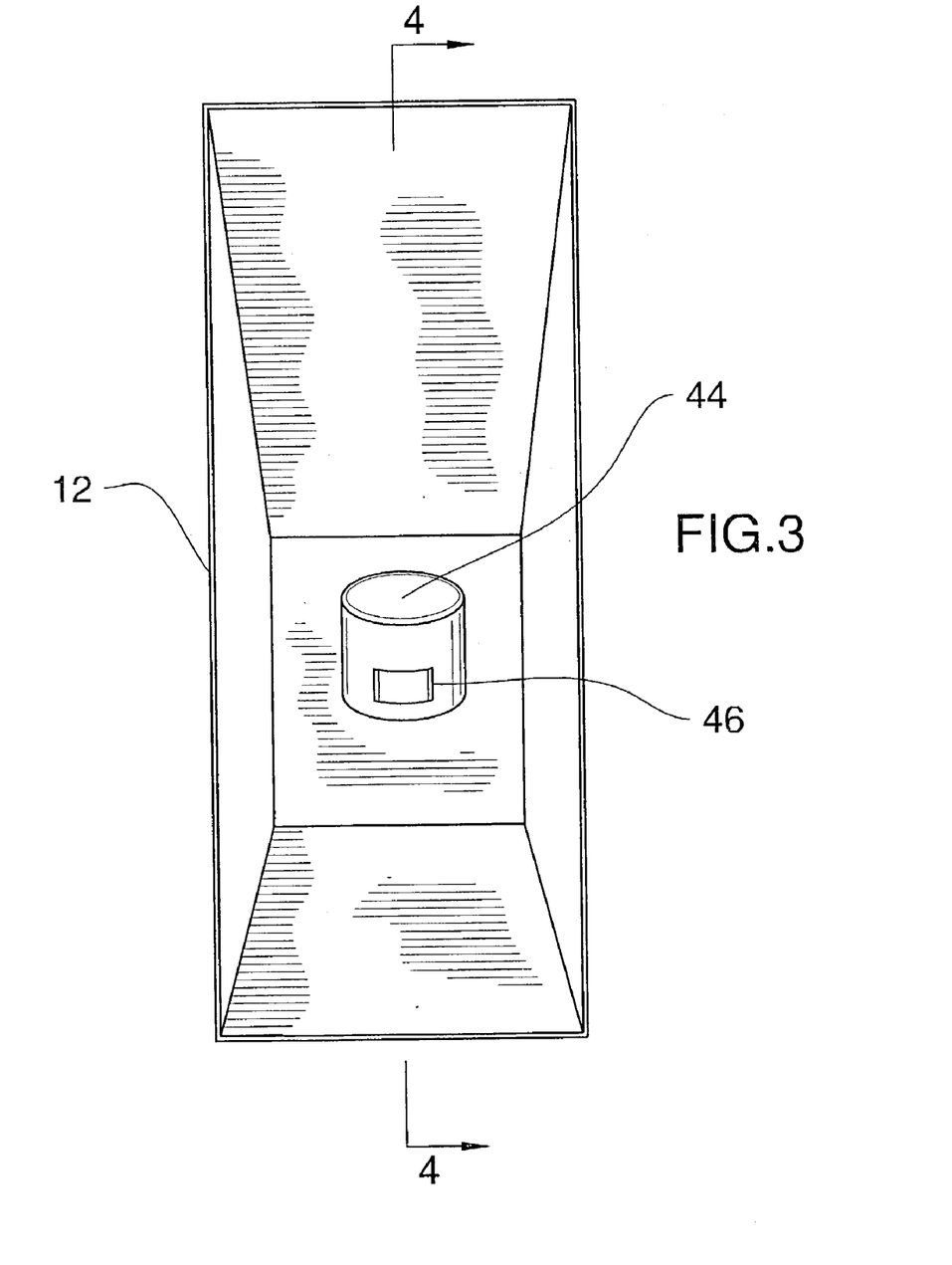
FIG. 3 is a top perspective view of the hopper of the pneumatic particulate dispensing system of the present invention.

As best illustrated in FIGS. 2 and 3, a rotary valve 40 is inserted and retained in the flanged adapter 14 and the T-fitting 16, and wherein the rotary valve extends into the interior of the hopper 12. The rotary valve 40 has at least one notch 42 located on the end opposite the flanged adapter 14 and the T-fitting 16 connection end. A valve cap 44 is rotatably connected to the end of the rotary valve 40 defining the notches 42. The valve cap 44 has at least one aperture 46. The apertures 46 are positioned on the valve cap 44 so as to correspond to the notches 44 of the rotary valve 42. The valve cap 44 is rotatably connected to the rotary valve 40 thereby allowing the cap to cover and close the notches 42 or to selectively align the apertures 46 with the notches allowing particulate material stored in the hopper 12 to be dispensed into the T-fitting 16. The rotation of the valve cap 44 provides a user with a means for adjustably controlling the amount of particulate material allowed to flow through the rotary valve 40.

Figure 4:
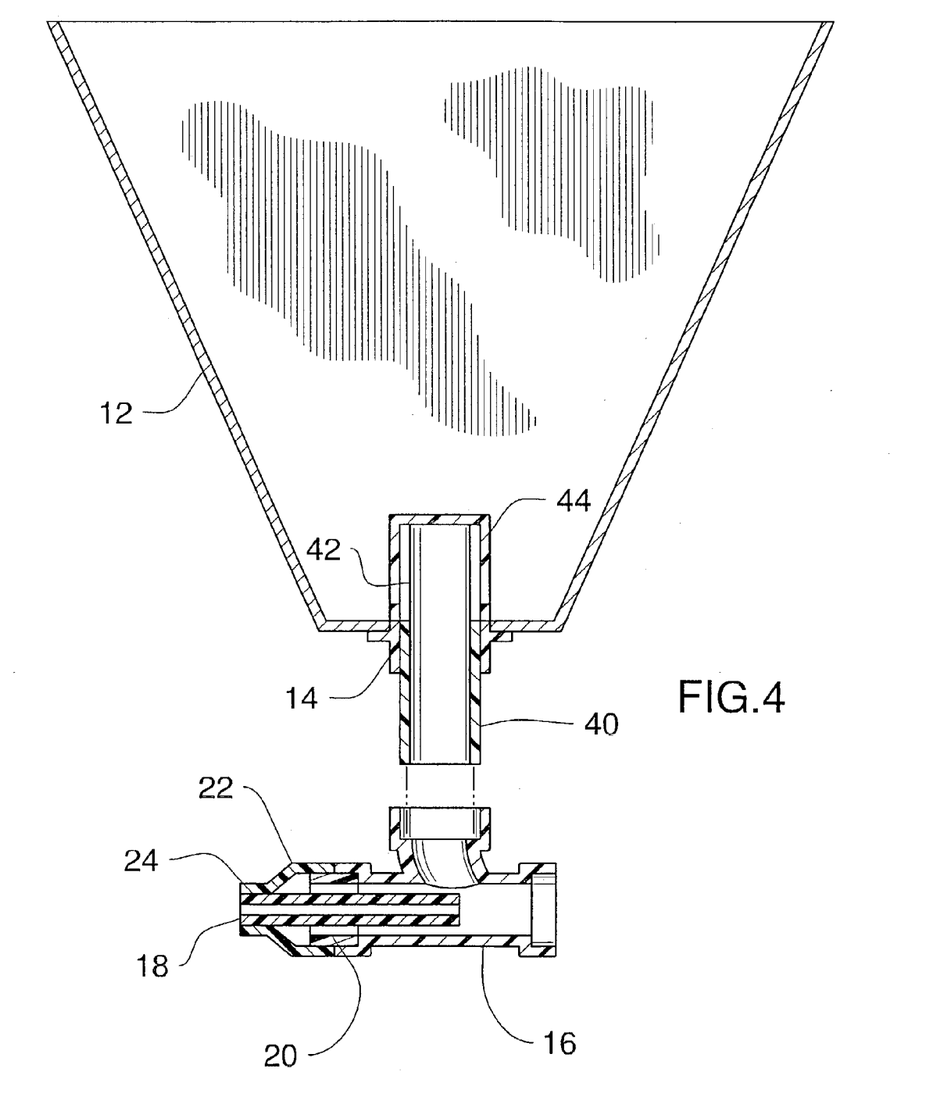
FIG. 4 is a cross-sectional view of the hopper, valve and T-fitting assembly of the pneumatic particulate dispensing system of the present invention.

A velocity tube 18 is connected to the tapered end 24 of the reducer 22. The velocity tube 18 can be connected to the tapered end 24 by a variety of connection systems such as, but not limited to, threaded connections, adhesive connections, pressure fitted connections, and clamped connections. All of the connections provide a fluid tight seal. The velocity tube 18 is hollow allowing for fluid to travel therethrough, and extends into the T-fitting 16 and terminates below the top oriented opening where the flanged adapter 14 and the rotary valve 40 is connected, as best illustrated in FIG. 4. As air from the pneumatic generating device 30 passes through the adapter tube 26 and the reducer 22, it enters the velocity tube 18 where the velocity of the air is increased. The velocity of the air is increased by that the interior volume of the adapter tube 26 and the reducer 22 is larger than interior volume of the velocity tube 18. The particulate material in the hopper 12 travels through the apertures 46 of the valve cap 44, through the notches 42 of the rotary valve 40, and then is deposited in the T-fitting 16 adjacent the terminating end of the velocity tube 18. The air traveling out of the velocity tube 16 forces the particulate material through discharge tube 48 and the discharge elbow tube 50. The top oriented opening of the T-fitting 16 may be angled or curved in configuration so as to discharge the particulate material in a direction corresponding to the flow of air exiting the velocity tube 18. Since the velocity tube 18 has a fluid tight connection seal with the taper end 24 of the reducer 22, there is no blowback force produced, thus producing a negative pressure in front of the velocity tube 18. The negative pressure at the terminating end of the velocity tube 18 creates a vacuum which pulls the particulate material from the hopper 12 through the apertures 46 of the valve cap 44, then through the notches 42 of the rotary valve 40 when the valve cap is rotated so as to align the apertures of the valve cap with the notches of the rotary valve.

A rigid discharge extension tube 60 or a flexible discharge extension tube 62 is removably connected the second end 58 of the discharge elbow tube 50. The discharge tubes 60 and 62 have a diameter larger than the diameter of the second end 58 of the discharge elbow tube 50. A nozzle 64 is removably connected to the free end of the discharge extension tubes 60 and 62, and is able to rotate with respect the discharge tubes 60 and 62. The discharge tubes 60 and 62, and the nozzle 64 are hollow, allowing fluid to travel therethrough. The nozzle 64 can be of any desired configuration, such as an angled nozzle, a flattened nozzle, a spreader nozzle, or the like. The discharge extension tubes 60 and 62 allow the user to remotely dispense the particulate material from the hopper 12 to, for example, an overhead animal feeder, a silo, a trough, or onto the ground.

Figure 5:
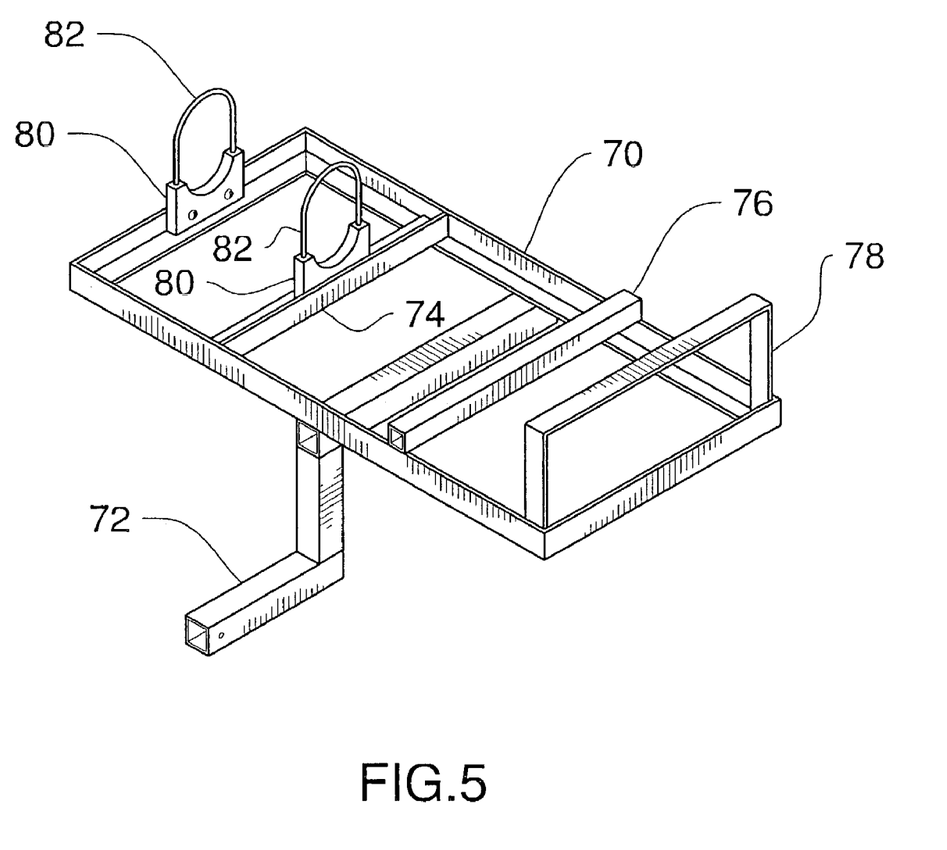
FIG. 5 is a perspective view of the support frame of the pneumatic particulate dispensing system of the present invention.
Figure 6:
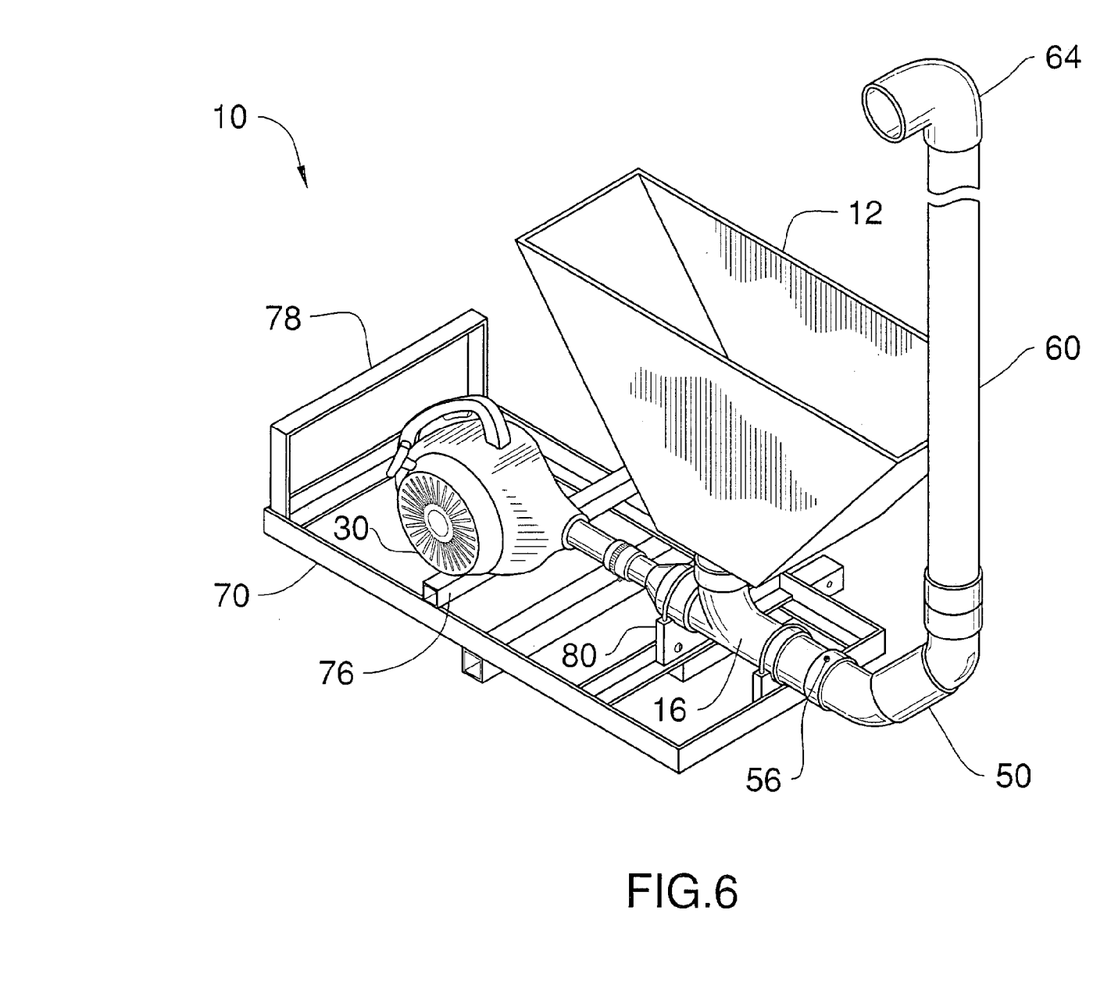
FIG. 6 is a perspective view of the pneumatic particulate dispensing system of the present invention.

The pneumatic generating device 30, reducer 22, T-fitting 16, hopper 16, discharge tube 48, discharge elbow tube 50, and discharge extension tubes 60 and 62 are supported on a support frame 70. The support frame 70, as best illustrated in FIG. 5, has generally rectangular configuration with a hitch insert 72 extending outward from the support frame 70. The hitch insert 72 can extend outward from the support frame 70 along the same axis of the support frame, or can be offset from the support frame axis, thus elevating the support frame off the ground. At least one cross member 74 is positioned between two side sections of the support frame 70 and located within the interior of the support frame. A support cross member 76 is position between side sections of the support frame 70 parallel the cross member 76 and attached above the support frame. The support cross member 76 is adapted to support the pneumatic generating device 30. At least one cradle 80 is attached to the support frame 70 or the cross member 72 which is adapted to support the reducer 22, the T-fitting 16, the discharge tube 48, or the discharge elbow tube 50. A U-bolt 82 secures the reducer 22, the T-fitting 16, the discharge tube 48, or the discharge elbow tube 50 to the cradle 80. The U-bolt 82 has threaded shafts which extend through bores located in the cradle 80 and are secured by nuts. FIG. 6 best illustrates the assembled pneumatic particulate dispensing system 10 mounted on the support frame 70. The support frame 70 can be inserted into retained in a vehicle hitch so as to provide the user with an easy means for transporting the pneumatic particulate dispensing system 10 to remote locations.

The pneumatic particulate dispensing system 10 is designed as a lightweight system for hunters to fill feeders with corn, protein, or the like. It is designed so that a single user could fill the feeders at remote locations. The hitch insert 72 can be adapter to fit any standard vehicle receiver hitch. The pneumatic particulate dispensing system 10 once attached to a vehicle through its hitch assembly, can dispense a variety of particulate material onto any surface travelable by the vehicle, such as dispensing salt onto to roadways, or dispensing seeds onto the farm lands.

In use, it can now be understood that a user would assemble the pneumatic particulate dispensing system onto the support frame and connect the pneumatic particulate dispensing system to the hitch assembly of a vehicle. The user would then rotate the valve cap to correspond to the amount of particulate material the user wishes to be dispensed into the airflow. The user would then fill the hopper with the desired particulate material. The proper discharge extension tube is then attached to the second end of the discharge elbow tube and the proper nozzle is chosen which corresponds to the labor that is to be performed. The pneumatic generating device would then be activated and the user would position the discharge elbow tube and the discharge extension tube to its proper operating position.

An example of such a use would be the filling of animal feeders by hunters. The hunter would assemble the pneumatic particulate dispensing system onto the support frame and connect the pneumatic particulate dispensing system to the hitch assembly of a vehicle. The hunter would adjust the valve cap and fill the hopper with the desired animal feed. The hunter would drive vehicle out to the location of the animal feeder and position the pneumatic particulate dispensing system near the animal feeder. The hunter would then activate the pneumatic generating device and position the discharge elbow tube and the discharge extension tube so as to allow the animal feed to dispense out the nozzle and into the animal feeder.

While a preferred embodiment of the pneumatic particulate dispensing system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pneumatic particulate dispensing system for providing a portable device for pneumatically dispensing particulate material comprising:

- a particulate material container for storing particulate material therein;
- a fitting connected to said particulate material container, said fitting being hollow and in fluid communication with said particulate material container;
- a conduit adapter connected to said fitting and adapted to connect an air blowing unit to said fitting, said conduit adapter being in fluid communication with said fitting;
- a valve connected to said fitting and said particulate material container, wherein said valve is a rotary valve connected to said fitting, said rotary valve being insertable in said particulate material container and extending into said particulate material container; and
- a discharge tube connected to said fitting.

2. The pneumatic particulate dispensing system of claim 1, and further comprising a support frame having a hitch member, wherein said support frame being adapted to support said pneumatic particulate dispensing system thereon.

3. The pneumatic particulate dispensing system of claim 1, and further comprising a velocity increasing tube positioned in the interior of said fitting adjacent to said conduit adapter, said velocity increasing tube being in fluid communication with said conduit adapter and said fitting.

4. The pneumatic particulate dispensing system of claim 1, and further comprising a discharge adapter rotatably connected to said discharge tube.

5. The pneumatic particulate dispensing system of claim 4, and farther comprising a discharge extension tube connected to said discharge adapter.

6. The pneumatic particulate dispensing system of claim 5, and further comprising a nozzle connected to said discharge extension tube.

7. A pneumatic particulate dispensing system for providing a portable device for pneumatically dispensing particulate material comprising:

- a particulate material container for storing particulate material therein, said particulate material container having a connection member attached thereto;
- a fitting connected to said particulate material container, said fitting being hollow and in fluid communication with said particulate material container;

a conduit adapter connected to said fitting and adapted to connect an air blowing unit to said fitting, said conduit adapter being in fluid communication with said fitting;

a velocity increasing tube having a connection end and a free end, said connection end of said velocity increasing tube being connected adjacent to said conduit adapter with said free end extending into the interior of said fitting, said velocity increasing tube being in fluid communication with said conduit adapter and said fitting;

a rotary valve connected to said fitting, said rotary valve being insertable in said connection member of said particulate material container and extending into said particulate material container; and a discharge tube connected to said fitting downstream of said velocity tube.

8. The pneumatic particulate dispensing system of claim 7, and further comprising a discharge adapter connected to said discharge tube.

9. The pneumatic particulate dispensing system of claim 8 wherein said discharge adapter is rotatably connected to said discharge tube, said discharge tube having a slot adapted to receive a member extending out from said discharge adapter for limiting the degree of rotation of said discharge adapter with respect to said discharge tube.

10. The pneumatic particulate dispensing system of claim 8 wherein said discharge adapter is rotatably connected to said discharge tube, said discharge tube having a slot adapted to receive a fastener inserted therethrough and secured to said discharge adapter for limiting the degree of rotation and locking said discharge adapter to said discharge tube.

11. The pneumatic particulate dispensing system of claim 7, and further comprising a support frame having a hitch member, wherein said support frame being adapted to support said pneumatic particulate dispensing system thereon.

12. The pneumatic particulate dispensing system of claim 11 wherein said support frame having at least one cradle adapted to support said pneumatic particulate dispensing system.

13. The pneumatic particulate dispensing system of claim 12, and further comprising a retaining member removably connected to said cradle for retaining said pneumatic particulate dispensing system therebetween.

14. The pneumatic particulate dispensing system of claim 7 wherein said rotary valve having a valve body and a valve cap rotatably connected to said valve body.

15. The pneumatic particulate dispensing system of claim 14 wherein said valve body having an aperture and said valve cap having an aperture allowing particulate material to pass therethrough when said aperture of said valve cap is rotated into alignment with said aperture of said valve body.

16. The pneumatic particulate dispensing system of claim 7 wherein the portion of said fitting which is connected to said particulate material container is angled so as to dispense the particulate material adjacent to said free end of said velocity increasing tube in substantially the direction of air flow from said air blowing unit.

17. A pneumatic particulate dispensing system for providing a portable device for pneumatically dispensing particulate material comprising:

a particulate material container for storing particulate material therein, said particulate material container having a connection member attached thereto;

a fitting connected to said particulate material container, said fitting being hollow and in fluid communication with said particulate material container;

a conduit adapter connected to said fitting and adapted to connect an air blowing unit to said fitting, said conduit adapter being in fluid communication with said fitting;

a velocity increasing tube having a connection end and a free end, said connection end of said velocity increasing tube being connected adjacent to said conduit adapter with said free end extending into the interior of said fitting, said velocity increasing tube being in fluid communication with said conduit adapter and said fitting;

a rotary valve assembly having a valve body and a valve cap rotatably connected to said valve body connected to said fitting, said valve body having an aperture and said valve cap having an aperture allowing particulate material to pass therethrough when said aperture of said valve cap is rotated into alignment with said aperture of said valve body, said rotary valve assembly being insertable in said connection member of said particulate material container and extending into said particulate material container;

a discharge tube connected to said fitting downstream of said velocity tube; and a support frame having a hitch member extending therefrom, said support frame being adapted to support said pneumatic particulate dispensing system thereon.

* * * * *